US007003602B2

(12) United States Patent
Selz et al.

(10) Patent No.: US 7,003,602 B2
(45) Date of Patent: Feb. 21, 2006

(54) DATA BUS

(75) Inventors: Alfred Selz, Deisslingen (DE); Veit Armbruster, St. Georgen (DE)

(73) Assignee: Thomson Licensing, Boulogne-Billancourt (FR)

( * ) Notice: Subject to any disclaimer, the term of this patent is extended or adjusted under 35 U.S.C. 154(b) by 188 days.

(21) Appl. No.: 10/432,712

(22) PCT Filed: Nov. 19, 2001

(86) PCT No.: PCT/EP01/13343

§ 371 (c)(1),
(2), (4) Date: Jan. 9, 2004

(87) PCT Pub. No.: WO02/42916

PCT Pub. Date: May 30, 2002

(65) Prior Publication Data

US 2004/0124871 A1 Jul. 1, 2004

(30) Foreign Application Priority Data

Nov. 27, 2000 (DE) ............................... 100 58 793

(51) Int. Cl.
*G06F 13/40* (2006.01)
(52) U.S. Cl. .................. 710/100; 326/21; 370/201; 361/111
(58) Field of Classification Search ............... 710/100; 326/21; 370/201; 375/254, 257; 455/39, 455/73; 361/111; 327/551, 552
See application file for complete search history.

(56) References Cited

U.S. PATENT DOCUMENTS

| 3,226,488 | A | * | 12/1965 | Sikorski et al. ............ 340/2.21 |
| 4,963,866 | A | * | 10/1990 | Duncan ..................... 341/110 |
| 5,446,772 | A | * | 8/1995 | Korhonen .................. 375/257 |
| 5,798,740 | A | * | 8/1998 | Bitzakidis et al. ............ 345/92 |
| 6,040,968 | A | * | 3/2000 | Duvvury et al. .............. 361/56 |

FOREIGN PATENT DOCUMENTS

| JP | 11-234158 | 8/1999 |
| WO | 99/31598 | 6/1999 |

OTHER PUBLICATIONS

"Low cost multi-channel 16-bit transient digitizer system for the PBX-M machine" by Feng, H. (abstract only) Publication Date: Oct. 2-6, 1989.*
Patent Abstracts of Japan, vol. 1999, No. 13, Nov. 30, 1999 & JP 11-234158.
Copy of Search Report dated Dec. 18, 2002.

* cited by examiner

*Primary Examiner*—Gopal C. Ray
(74) *Attorney, Agent, or Firm*—Joseph S. Tripoli; Robert D. Shedd; Brian J. Cromarty

(57) ABSTRACT

In apparatuses (1, 2, 3) controlled or operated via an $I^2C$ bus, it may be necessary to take measures to suppress interference signals at the data signal input/output of the respective apparatus without impairing the data transport at the same time. The data line at the data signal input/output contains an RC element, in the form of a low-pass filter, with a diode connected in parallel with the RC element, the low-pass filter action allowing the arrangement to be used to suppress interference signals acting on the data signal input/output, and, secondly, the transmissive action of the diode meaning that the arrangement does not impair a data signal leaving the data signal input/output.

3 Claims, 1 Drawing Sheet

DATA BUS

This application claims the benefit, under 35 U.S.C. §365 of International Application PCT/EP01/13343, filed Nov. 19, 2001, which was published in accordance with PCT Article 21(2) on May 30, 2002 in English and which claims the benefit of German patent application No. 10058793.3, filed Nov. 27, 2000.

The invention is based on a data transfer system having a data bus, in particular having an I2C data bus, in accordance with the precharacterizing clause of Claim 1.

The use of an I2C bus, which in the simplest application instance comprises a "serial data line" SDA and a "serial clock line" SCL, is known for bidirectional transfer of data and clock signals for intercommunicating appliances and/or appliance components, called apparatuses below. In this case, a respective one of the apparatuses acts as a transmitter and/or as a "master", while another reacts as a receiver, called the addressed apparatus below.

Interference signals—in particular crosstalk from radio-frequency signal components in the, clock signal of the apparatus acting as transmitter and/or master to the data input/output of an apparatus which is not being addressed in this case—may mean that it is necessary to take appropriate measures to suppress interference signals in order to prevent operating faults in the apparatuses. Known measures are gate circuit functions, also called I2C bus gating, using integrated circuits, and/or less effective means, such as electrical screening of bus lines and appropriate provisions in the circuit layout.

Another means of suppressing interference signals is to use a low-pass filter having a resistor $R_S$ connected in series with the data input/output of the respective apparatus, but in this case conditions associated with the use of such a data transfer system (see I2C bus specification, e.g. I2C bus allocation table General, 1997 Mar. 3, from PHILIPS)—in particular on account of the rise and fall time requirements for the pulse edges of data and clock signals—severely restrict the dimensioning of such a resistor $R_S$. In addition, a low-pass filter formed using an RC element impairs the "Acknowledge" function of such apparatuses.

It is therefore an object of the invention to use relatively simple means to suppress interference signals in a data transfer system having a data bus without impairing the data traffic.

This object is achieved by a data transfer system having a data bus, as specified in claim 1.

The invention is based on the following requirements and insights: when apparatuses are controlled or operated via an I2C, bus—such as the tuner in today's television sets, which controlled by the apparatuses for operating the set—it is necessary for the tuner addressed via the bus to give an acknowledgement (ACK) for confirmation purposes for each data word transferred. In this context, measures for suppressing interference signals on the data line are, in principle, not necessary for the apparatus addressed—or in this case for the tuner addressed—on account of the imped-ance and signal-magnitude circumstances during data trans-fer; however, it is important for the respective bit (ACK) provided for acknowledgement purposes to be clearly detectable by the control apparatus acting as transmitter and master.

If, however, a different apparatus—such as a "microcon-troller" provided in the television set for setting video and/or audio signals—is addressed by the control apparatus, it is necessary to keep interference signals away from the appro-priate data input/output of the tuner, which is now no longer being addressed, which could, in principle, be done using an RC element in the form of a low-pass filter, if this were not prevented by such a low-pass filter's impairment of the transmission quality for acknowledging bits provided (ACK).

The invention overcomes this drawback, which would be caused by merely using an RC element in the form of a low-pass filter while using the aforementioned I2C bus specification, by connecting a diode in parallel with the RC element such that the RC element is able to suppress interference signals effectively and, secondly—when an apparatus is addressed via such a data bus—virtually does not impair the transmission quality of data signals.

The invention has the advantage that it can be imple-mented using relatively simple electrical components and makes the transfer of bits provided for acknowledgement (ACK) more reliable.

Other advantages and developments can be found in the description below and in the claims.

The invention is explained in more detail with reference to a drawing, in which

Figure 1:
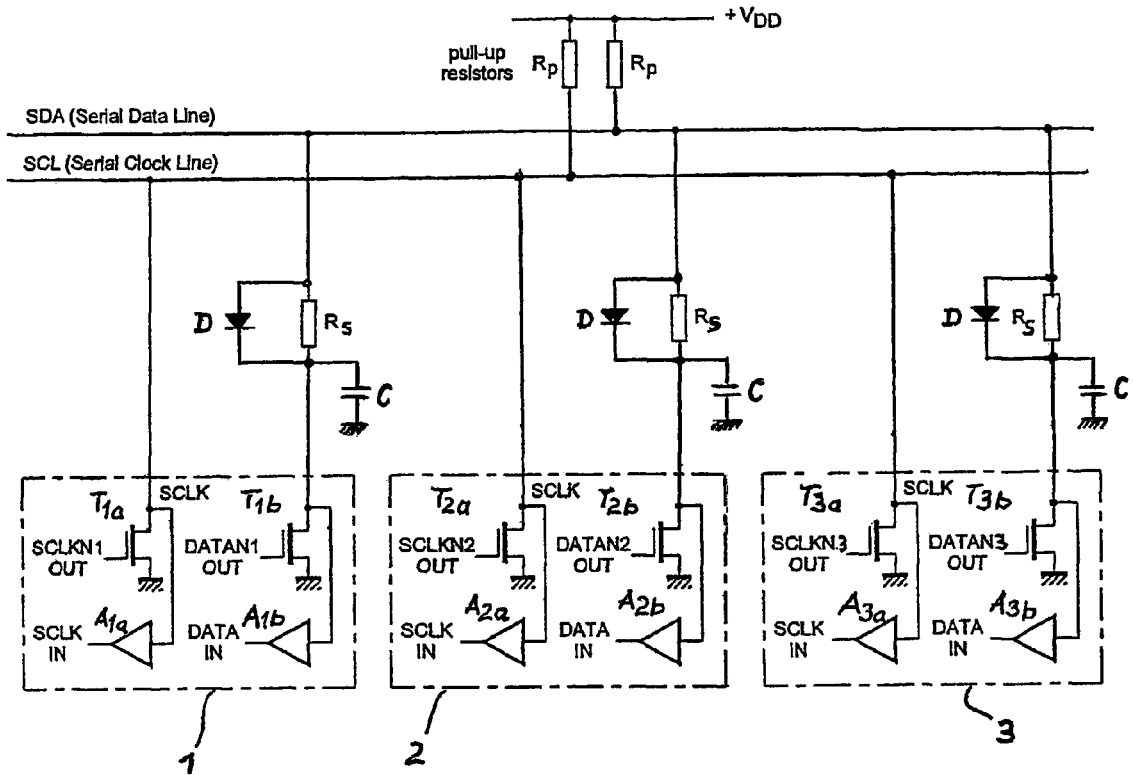
FIG. 1 shows a simplified illustration of a data transfer system in an appliance.

FIG. 1 shows an illustration, in block-diagram form, of apparatuses 1–3 capable of communicating via an I2C bus 4, such as a tuner 1, an appliance operating and control apparatus 2 having a microprocessor, and an electronic adjustment apparatus 3 for video and audio signals in a television set (not shown).

The I2C bus 4 comprises, in a manner known per se, a serial data line SDA and a serial clock line SCL for bidi-rectional transfer of data signals DATAN1–DATAN3 and clock signals SCLKN1–SCLKN3, the data line SDA and the clock line SCL being electrically connected to a positive supply voltage $V_{DD}$ via a respective "pull-up resistor" $R_p$. The clock line SCL is electrically connected to the clock signal input of the respective apparatus 1–3, the clock signal input of an apparatus simultaneously being the clock signal output thereof as well, as is known.

By contrast, the data line SDA is electrically connected via a respective low-pass filter, formed using a resistor $R_S$ and a capacitor C, to the data signal input of the respective apparatus 1–3—called data signal input/output below, since the data signal input of such an apparatus 1–3, too, is simultaneously the data signal output thereof as well. In this case, according to the invention, a diode D is connected in parallel with the resistor $R_S$ of the respective low-pass filter by electrically connecting the anode of said diode to the data line SDA and electrically connecting the cathode of said diode to the data signal input/output of the appropriate apparatus 1–3. However, when choosing the dimensions of the low-pass filter, it should be remembered that the I2C bus specification limits the "bus load capacitance" (e.g. to 400 pf). The bus load capacitance can be split in relation to the capacitance values of such low-pass filters in different ways, however, for example taking into account the susceptibility to interference of the respective apparatus 103.

To simplify understanding of the apparatuses 1–3 shown in FIG. 1, it may be pointed out, by way of addition, that the signal inputs of the amplifiers $A_{1a}$–$A_{3b}$ shown in symbol form within the respective apparatus 1–3 correspond to the respective clock signal input and the respective data signal input. At the same time, the drain connections of the field-effect transistors $T_{1a}$–$T_{3b}$ used as output amplifiers correspond to the signal outputs of the apparatuses 1–3.

Figure 2:
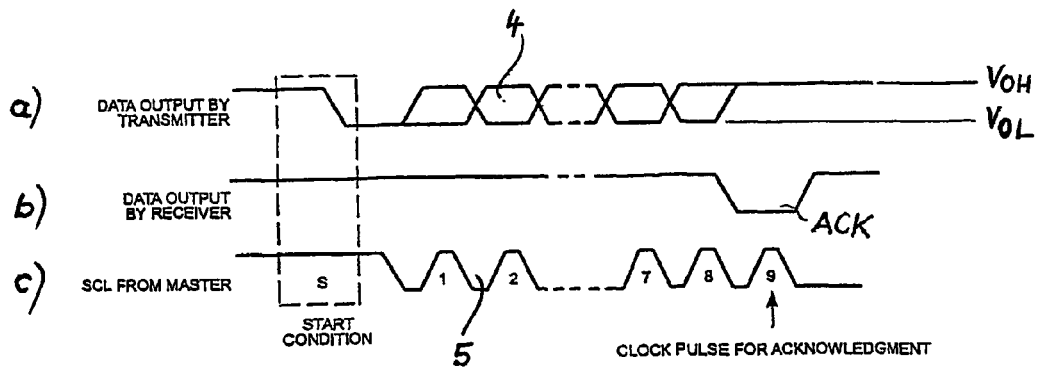
FIG. 2 shows a graph-like illustration of bits being transferred.

The way in which the circuit arrangement works is described below with reference to inherently known pulse diagrams a–c (FIG. 2) for the data traffic on an I2C bus: thus, by way of example, during communication between two apparatuses, the appliance operating and control apparatus 2 is meant to act as a transmitter and master, and the tuner 1 is meant to react as a receiver. To this end, the appliance operating and control apparatus 2 feeds a data signal 4 addressed to the tuner 1 (diagram a)—in conjunction with the supply of an appropriate pulsed clock signal 5 (diagram c) into the clock line SCL—into the data line SDA. The data signal 4 is known to comprise a sequence of pulsed data words which respectively last eight clock pulses and can be read by the tuner 1 on the basis of appropriate addressing, the tuner 1 outputting a pulse denoted ACK (diagram b) onto the data line SDA at the end of such a data word—i.e. during the respective ninth clock pulse—for the purposes of acknowledging reception by turning on the field-effect transistor $T_{1b}$, used as output amplifier, for a prescribed time such that the drain connection of said field-effect transistor practically carries reference-earth potential. This means that current can flow through diode D. Hence, the magnitude of the aforementioned pulse ACK is reduced merely by the diode forward voltage, which is approximately 0.2 volt when a germanium diode is used, for example, so that pulses ACK for acknowledging reception of data words remain virtually unimpaired—despite the use of such a low-pass filter for suppressing interference signals.

Another advantage obtained is that, for such a low-pass filter, correspondingly larger values can be used for the resistance $R_S$ and the capacitance C, which values, without the inventive use of the diode D, would otherwise infringe the I2C BUS specification. This is because, without the inventive use of the diode D, the maximum permitted voltage drop across the resistor $R_S$ determines the maximum value thereof when the data line SDA is switched from the "pulse HIGH" level $V_{OH}$ to the "maximum pulse LOW" level $V_{OLmax}$ (e.g. 0.4 volt at 3 milliamps output current). On the basis of the I2C bus specification, however, the rise time $t_r$ of the pulse edges is affected primarily by the bus load capacitance and the pull-up resistor $R_p$. This means that, if the low-pass filter capacitance C is enlarged, it is only necessary to involve a corresponding reduction in the size of the pull-up resistor $R_p$.

Correspondingly larger values for the resistance $R_S$ and the capacitance C can be ascertained, for example, using measurements while observing the maximum permissible pulse rise time $t_{rmax}$ (of 1000 nanoseconds, for example).

What is claimed is:

1. Data transfer system for intercommunicating apparatuses having a data bus which comprises a serial data line and a serial clock signal line and having interference signal suppression means for preventing signal crosstalk from the clock signal line to the data line and/or vice versa, wherein the data line to the data signal input/output of an apparatus connected to the data bus contains an RC element, in the form of a low-pass filter, with a diode connected in parallel with the RC element, the low-pass filter action allowing said arrangement to be used to suppress interference signals acting on the data signal input/output, and, secondly, the transmissive action of the diode meaning that said arrangement does not impair a data signal leaving the data signal input/output.

2. Data transfer system according to claim 1, wherein the diode used is a germanium diode.

3. Data transfer system according to claim 1, characterized in that wherein RC elements in the form of low-pass filters for such apparatuses have different cut-off frequencies.

* * * * *